(12) United States Patent
Yao et al.

(10) Patent No.: US 11,830,668 B2
(45) Date of Patent: Nov. 28, 2023

(54) METHOD OF MANUFACTURING PERMANENT MAGNET OF ROTOR FOR AXIAL FLUX ELECTRIC MACHINE YIELDING PERMANENT MAGNET WITH LOW LOSS AND LOW COST

(71) Applicant: GM GLOBAL TECHNOLOGY OPERATIONS LLC, Detroit, MI (US)

(72) Inventors: Jian Yao, Shanghai (CN); Denghao Fan, Shanghai (CN); Alan G. Holmes, Clarkston, MI (US); Yusheng Zou, Northville, MI (US); Thomas W. Nehl, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/724,618

(22) Filed: Apr. 20, 2022

(65) Prior Publication Data
US 2023/0274880 A1    Aug. 31, 2023

(30) Foreign Application Priority Data
Feb. 28, 2022  (CN) .......................... 202210185477.6

(51) Int. Cl.
*H02K 15/03*  (2006.01)
*H01F 41/02*  (2006.01)

(52) U.S. Cl.
CPC ......... *H01F 41/0286* (2013.01); *H02K 15/03* (2013.01); *Y10T 29/49075* (2015.01)

(58) Field of Classification Search
CPC .. H02K 1/2793; H02K 1/2798; H02K 1/2796; H02K 16/02; H02K 1/27; H02K 2201/03; H02K 15/03; H02K 21/12; H02K 29/08; H02K 1/06; Y10T 29/49075
USPC ........................ 29/607, 596, 598, 602.1, 606
See application file for complete search history.

(56) References Cited

U.S. PATENT DOCUMENTS

2015/0229194 A1 *  8/2015  Sromin .................. H02K 16/02
                                                     310/156.32

* cited by examiner

*Primary Examiner* — Thiem D Phan (57) ABSTRACT

A method of manufacturing a permanent magnet for a rotor of an axial flux electric machine is described herein. The method includes forming multiple permanent magnet (PM) pieces to have the same shape. Each of the PM pieces has an inner radial surface, an outer radial surface, and a pair of side surfaces extending between the inner and outer radial surfaces. The method further includes attaching at least one of the side surfaces of each of the PM pieces to one of the side surfaces of another one of the PM pieces to form partitions configured to extend in a radial direction of the rotor.

7 Claims, 6 Drawing Sheets

METHOD OF MANUFACTURING PERMANENT MAGNET OF ROTOR FOR AXIAL FLUX ELECTRIC MACHINE YIELDING PERMANENT MAGNET WITH LOW LOSS AND LOW COST

CROSS-REFERENCE TO RELATED APPLICATIONS

This application claims the benefit of Chinese Patent Application No. 202210185477.6, filed on Feb. 28, 2022. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to methods of manufacturing a permanent magnet of a rotor for an axial flux electric machine yielding a permanent magnet with low loss and low cost.

Generally, the term electric machine covers electric motors and electric generators. Electric motors convert electrical energy into mechanical work by the production of torque, while electric generators convert mechanical work to electrical energy. Electric vehicles, including battery electric vehicles, hybrid vehicles and fuel cell vehicles, employ electric machines, such as induction motors and permanent magnet motors, to propel the vehicles when acting as an electric motor, as well as to capture braking energy when acting as an electric generator. Motors will be referred to herein; however, it will be understood that such principles also equally apply to generators. Generally, the electric motor includes a rotor that rotates during operation and a stator that is stationary. The rotor may contain a plurality of permanent magnets and rotates relative to the fixed stator. The rotor is connected to a rotor shaft that also rotates with the rotor. The rotor, including the permanent magnets, is separated from the stator by a predetermined air gap. The stator includes conductors in the form of windings. When electrical energy is applied through the windings, a magnetic field is generated. When electric energy is fed into the windings of the stator, the power is transferred by a magnetic flux that acts on the permanent magnets in the rotor. In this manner, mechanical power can be transferred to the rotating rotor shaft. In an electric vehicle, the rotor thus transmits torque via the rotating shaft to the drive wheels of the vehicle.

Two common types of electric motors include radial flux and axial flux type motors. In a radial flux motor, the rotor and stator are typically situated in a concentric or nested configuration, so that when a stator is energized, it creates a magnetic flux that extends radially from the stator to the rotor. Thus, the windings in the stator are typically arranged parallel to an axis of rotation so that a magnetic field is generated that is oriented in the radial direction from the axis of rotation (along the rotor shaft).

In an axial flux motor, a magnetic field parallel to an axis of rotation is produced by the windings in the stator, so the magnetic flux extends parallel to an axis of rotation (parallel to the rotor shaft). In certain applications, axial flux motors are desirable because they are relatively lightweight, generate increased power, and have a compact size as compared to radial flux motors.

SUMMARY

A first example of a method of manufacturing a permanent magnet for a rotor of an axial flux electric machine is described herein. The method includes forming multiple permanent magnet (PM) pieces to have the same shape. Each of the PM pieces has an inner radial surface, an outer radial surface, and a pair of side surfaces extending between the inner and outer radial surfaces. The method further includes attaching at least one of the side surfaces of each of the PM pieces to one of the side surfaces of another one of the PM pieces to form partitions configured to extend in a radial direction of the rotor.

In one aspect, the method further includes forming the PM pieces to have substantially the same dimensions.

In one aspect, the method further includes forming the inner radial surface of each of the PM pieces to have a concave shape, forming the outer radial surface of each of the PM pieces to have a convex shape, and forming each of the side surfaces of each of the PM pieces to have a flat shape.

In one aspect, the method further includes attaching at least one of the side surfaces of each of the PM pieces to one of the side surfaces of another one of the PM pieces so that the inner radial surfaces of the PM pieces form a continuous arc and the outer radial surfaces of the PM pieces form a continuous arc.

In one aspect, the PM pieces include end PM pieces and at least one middle PM piece, and the method further includes attaching each of the side surfaces of the at least one middle PM piece to one of the side surfaces of another one of the PM pieces and attaching only one of the side surfaces of each of the end PM pieces to one of the side surfaces of another one of the PM pieces.

In one aspect, the method further includes cutting through the end PM pieces, without cutting through the at least one middle PM piece, to form partitions configured to extend in a tangential direction of the rotor.

In one aspect, the method further includes forming the end PM pieces from a first material and forming the at least one middle PM piece from a second material that is different than the first material.

A second example of a method of manufacturing a permanent magnet for a rotor of an axial flux electric machine is described herein. The method includes forming multiple permanent magnet (PM) pieces from a single PM piece having a uniform thickness. Each of the PM pieces has an inner radial surface, an outer radial surface, and a pair of side surfaces extending between the inner and outer radial surfaces. The method further includes attaching at least one of the inner and outer radial surfaces of each of the PM pieces to one of the inner and outer radial surfaces of another one of the PM pieces.

In one aspect, the method further includes forming the PM pieces to have the same shape.

In one aspect, the method further includes forming the PM pieces to have different dimensions.

In one aspect, the thickness of the single PM piece extends between top and bottom surfaces thereof, and the method further includes making multiple cuts in the single PM piece at an oblique angle with respect to the top and bottom surfaces to form the PM pieces.

In one aspect, the method further includes forming the inner and outer radial surfaces of each of the PM pieces to have a flat shape and forming the side surfaces of each of the PM pieces to have a flat shape oriented at an oblique angle with respect to the inner and outer radial surfaces of the respective PM piece.

In one aspect, the PM pieces include end PM pieces and at least one middle PM piece, and the method further includes attaching each of the inner and outer radial surfaces of the at least one middle PM piece to one of the inner and outer radial surfaces of another one of the PM pieces and attaching only one of the inner and outer radial surfaces of each of the end PM pieces to one of the inner and outer radial surfaces of another one of the PM pieces.

In one aspect, the method further includes attaching at least one of the inner and outer radial surfaces of each of the PM pieces to one of the inner and outer radial surfaces of another one of the PM pieces so that the side surfaces of the PM pieces form a pair of straight edges on opposite sides of the permanent magnet.

A third example of a method of manufacturing a permanent magnet for a rotor of an axial flux electric machine is described herein. The method includes making multiple permanent magnet (PM) pieces to have the same triangular shape. Each of the PM pieces has three side surfaces that form the triangular shape. The method further includes attaching at least one of the side surfaces of each of the PM pieces to the side surfaces of another one of the PM pieces.

In one aspect, the method further includes forming each of the PM pieces to have a perimeter in the shape of an isosceles triangle.

In one aspect, the method further includes attaching at least one of the side surfaces of each of the PM pieces to the side surfaces of another one of the PM pieces to form a trapezoidal shape.

In one aspect, the method further includes attaching at least one of the side surfaces of each of the PM pieces to the side surfaces of another one of the PM pieces to form a pair of non-straight edges on opposite sides of the permanent magnet.

In one aspect, each of the non-straight edges has a zigzag shape.

In one aspect, the non-straight edges are configured to be oriented in a radial direction of the rotor.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
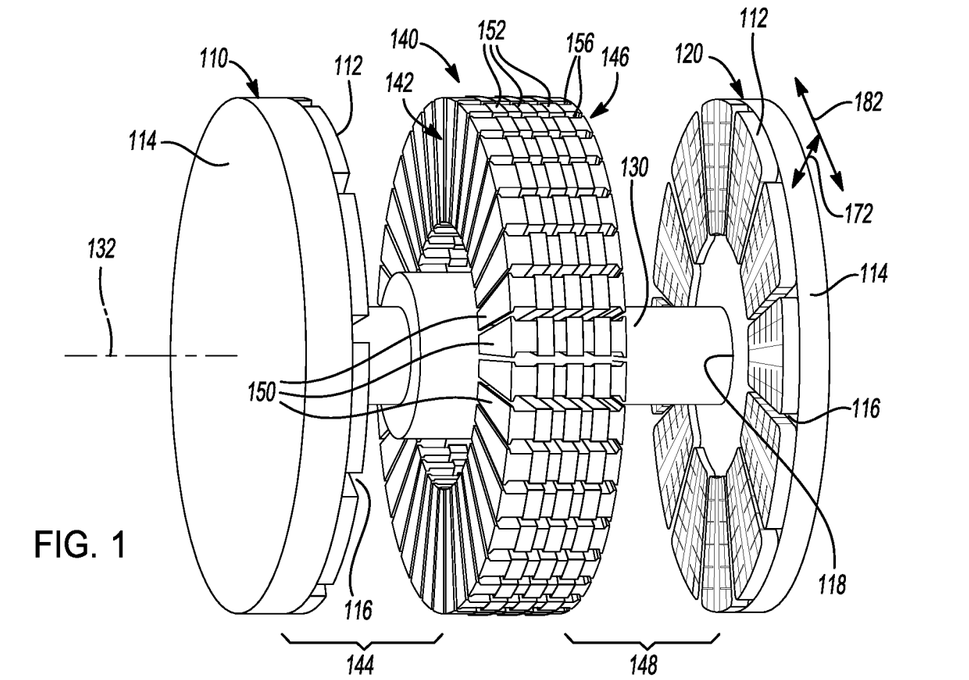
FIG. 1 is an exploded perspective view of an axial flux motor including a rotor with an example of a permanent magnet according to the principles of the present disclosure.

In various aspects, the present disclosure pertains to permanent magnets of rotors for axial flux electric machines. It will be appreciated that the concepts apply not only to axial flux motors that generate mechanical energy from electrical energy, but also to axial flux generators that can generate electrical energy from mechanical energy. A non-limiting example of an electric machine in the form of an axial flux motor 100, also known as a pancake motor, is shown in FIG. 1. The motor 100 has a first rotor 110 and a second rotor 120 both connected to and configured to rotate about a rotor shaft 130. Both the first and second rotors 110, 120 have an annular or disk shape with a centrally disposed aperture 118. The rotor shaft 130 passes through the centrally disposed aperture 118. The rotor shaft defines a rotational axis 132 about which the rotor turns.

A stator 140 is disposed between the first rotor 110 and the second rotor 120. The stator 140 has an annular or disk shape. The stator 140 is fixed and stationary, while the first and second rotors 110, 120 rotate during operation with the rotor shaft 130. The first rotor 110 faces a first side 142 of the stator 140 and defines a first air gap 144 therebetween. The second rotor 120 faces a second side 146 of the stator 140 and defines a second air gap 148 therebetween.

Though motor 100 is shown to have a central single stator 140 and two external rotors 110, 120, as appreciated by those of skill in the art, other configurations are also contemplated. These other variations may include those having two stators and a single rotor, or where the electric motor assembly includes more or fewer rotors and/or stators. The ensuing description also applies to these other embodiments. Further, though not currently shown, the skilled artisan will appreciate that in various aspects, electric motor assemblies may further include a housing and the rotors and stators and shaft may be disposed within the housing. The housing may, in certain aspects, be fixed to a vehicle frame and the shaft may be coupled to a gearbox, for example a reduction gearbox, within the vehicle.

Each of the first rotor 110 and the second rotor 120 can have the same design (facing in opposite directions towards the stator 140) and thus the common components will be described herein. Each of the first rotor 110 and second rotor 120 includes a plurality of permanent magnets 112 affixed to a rotor body 114. The permanent magnets 112 may have alternating polarity. Each permanent magnet 112 defines a channel 116 therebetween, which extends radially along a face of the respective rotor. In this manner, the permanent magnets 112 and the channel 116 can together define a plurality of magnetic poles.

The stator 140 includes a plurality of stator cores 150 about which a plurality of windings 152 are wrapped. The windings 152 may comprise copper or copper alloys. The stator 140 defines a plurality of slots 156 between adjacent stator cores 150, and the windings 152 extend over or bridge the slots 156. The stator 140 may be fixed and stationary. Although not illustrated, other winding configurations and technologies as understood in the art are also contemplated. For example, the slots 156 may receive the windings 152, which may be wound in and through the slots 156.

Rotor shaft 130 passes through a centrally disposed aperture 118 in the stator 140 and is supported by bearings that align the rotors 110, 120 with respect to the stator 140 while allowing rotation of the rotor shaft 130. The windings 152 of the stator 140 may be formed of copper or other conductive wires configured to generate a magnetic field when current is applied so as to interact with magnetic fields of the plurality permanent magnets 112 having poles that alternate about the circumference the first and second rotors 110, 120. Different regions of the stator 140 may be selectively energized to impart a rotational force on the first and second rotors 110, 120 causing the rotors 110, 120 and the rotor shaft 130 to rotate with respect to the rotational axis 132. The axial flux motor 100 having a single stator 140 and first and second rotors 110, 120 is capable of use in high torque applications, including for use in an electric or hybrid vehicle. In such a variation, a housing encasing the motor 100 may be attached to the vehicle frame and at least one output from an end of the rotor shaft 130 is coupled to a reduction gearbox or directly to the vehicle drive wheels. The vehicle application of the axial flux motor 100 is provided as an exemplary embodiment and is not intended to be limiting.

Figure 2:
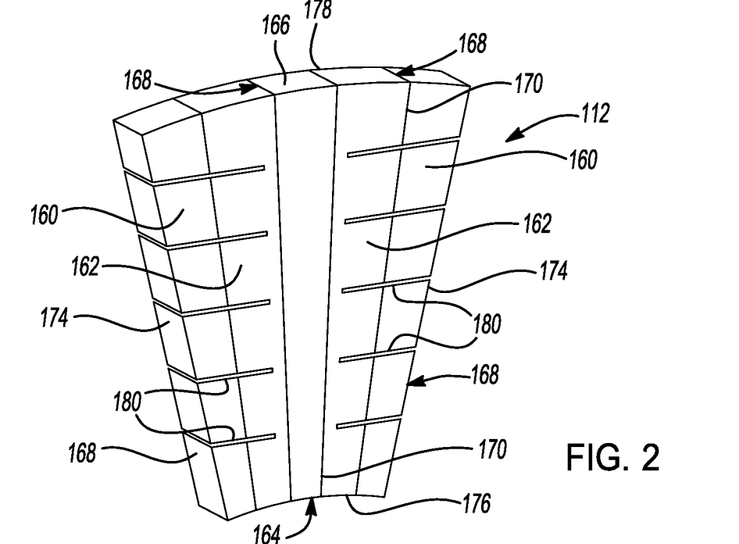
FIG. 2 is a perspective view the permanent magnet of FIG. 1.

Referring now to FIG. 2, each permanent magnet 112 includes end permanent magnet (PM) pieces 160 and middle PM pieces 162. All the PM pieces 160, 162 have the same shape and substantially the same dimensions, which reduces manufacturing complexity. As referred to herein, the word "substantially," when applied to a characteristic of an element described, indicates that there may be a minor variation in the characteristic beyond what is exactly specified (for example, variation due to manufacturing tolerances) without having a substantial effect on the mechanical or physical attributes of the element.

In the example shown, the permanent magnet 112 includes five PM pieces 160, 162. However, the permanent magnet 112 may include additional or fewer PM pieces 160, 162. The end PM pieces 160 are formed from a first material, and the middle PM pieces are formed from a second material that may be different than the first material. For example, the first material may be a high-grade material, and the second material may be a lower grade material to reduce costs.

Each PM piece 160, 162 has an inner radial surface 164, an outer radial surface 166, and a pair of side surfaces 168 extending between the inner and outer radial surfaces 164 and 166. The inner radial surface 164 of each PM piece 160, 162 has a concave shape. The outer radial surface 166 of each PM piece 160, 162 has a convex shape. The side surfaces 168 of each PM piece 160, 162 have a flat shape.

The side surfaces 168 of the PM pieces 160, 162 are attached (e.g., glued) to one another to form partitions 170 between the PM pieces 160, 162 that are configured to extend in a radial direction 172 (FIG. 1) of each rotor 110, 120. The partitions 170 reduce eddy current loss of the permanent magnet 112. Only one side surface 168 of each end PM piece 160 is attached to the side surface 168 of one of the middle PM pieces 162, and the other side surface 168 of each end PM piece 160 forms one of two opposite edges 174 of the permanent magnet 112. Each side surface 168 of the middle PM pieces 162 is attached to the side surface 168 of another PM piece 160 or 162. The PM pieces 160, 162 are positioned relative to one another so that the inner radial surfaces 164 of the PM pieces 160, 162 form a continuous arc 176 and the outer radial surfaces 166 of the PM pieces 160, 162 form a continuous arc 178. Each continuous arc 176, 178 extends from one edge 174 of the permanent magnet 112 to the other edge 174 of the permanent magnet 112.

Cuts are made through the edges 174 of the permanent magnet 112 to form partitions 180 that are configured to extend in a tangential direction 182 (FIG. 1) of each rotor 110, 120. The partitions 180 further reduce eddy current loss of the permanent magnet 112. In the example shown, five cuts are made through each edge 174 of the permanent magnet 112. However, additional or fewer cuts may be made through the edges 174 of the permanent magnet 112. The cuts extend completely through the end PM pieces 160 and either extend only partially through the middle PM pieces 162 or do not extend through the middle PM pieces 162 at all. In the example shown, the cuts extend only partially through the middle PM pieces 162 attached to the end PM pieces 160, and the cuts do not extend through the other middle PM piece 162. Making the cuts through the edges 174 of the permanent magnet 112 without extending the cuts from one edge 174 completely to the other edge 174 maintains the mechanical strength of the permanent magnet 112.

With additional reference to FIG. 6, a method of manufacturing the permanent magnet 112 will now be described. The method begins at step 184. At step 186, the method forms the PM pieces 160, 162 to have the same shape with the inner radial surface 164, the outer radial surface 166, and the side surfaces 168 extending between the inner and outer radial surfaces 164 and 166. As discussed above, the inner radial surfaces 164 of each PM piece 160, 162 has a concave shape, the outer radial surface 166 of each PM piece 160, 162 has a convex shape, and the side surfaces 168 of each PM piece 160, 162 has a flat shape.

At step 188, the method forms the end and middle PM pieces 160 end 162 from different materials. For example, as discussed above, the end PM pieces 160 may be formed from a high-grade material, and the middle PM pieces may be formed from a lower grade material to save costs. At step 190, method attaches each side surface 168 of the PM pieces 162 to one side surface 168 of another PM piece 160 or 162. At step 192, the method attaches only one side surface 168 of each end PM piece 160 to one side surface 168 of one of the middle PM pieces 162.

At step 194, the method attaches the PM pieces 160, 162 to one another so that the inner radial surfaces 164 of the PM pieces 160, 162 form a continuous arc and the outer radial surfaces 166 of the PM pieces 160, 162 form a continuous arc. At step 196, the method attaches the side surfaces 168 of the PM pieces 160, 162 to one another to form the partitions 170 in the permanent magnet 112. At step 198, the method cuts through the end PM pieces 160, without cutting completely through the middle PM pieces 162, and thereby forms the partitions 180 in the permanent magnet 112. The method ends at 200.

Figure 6:
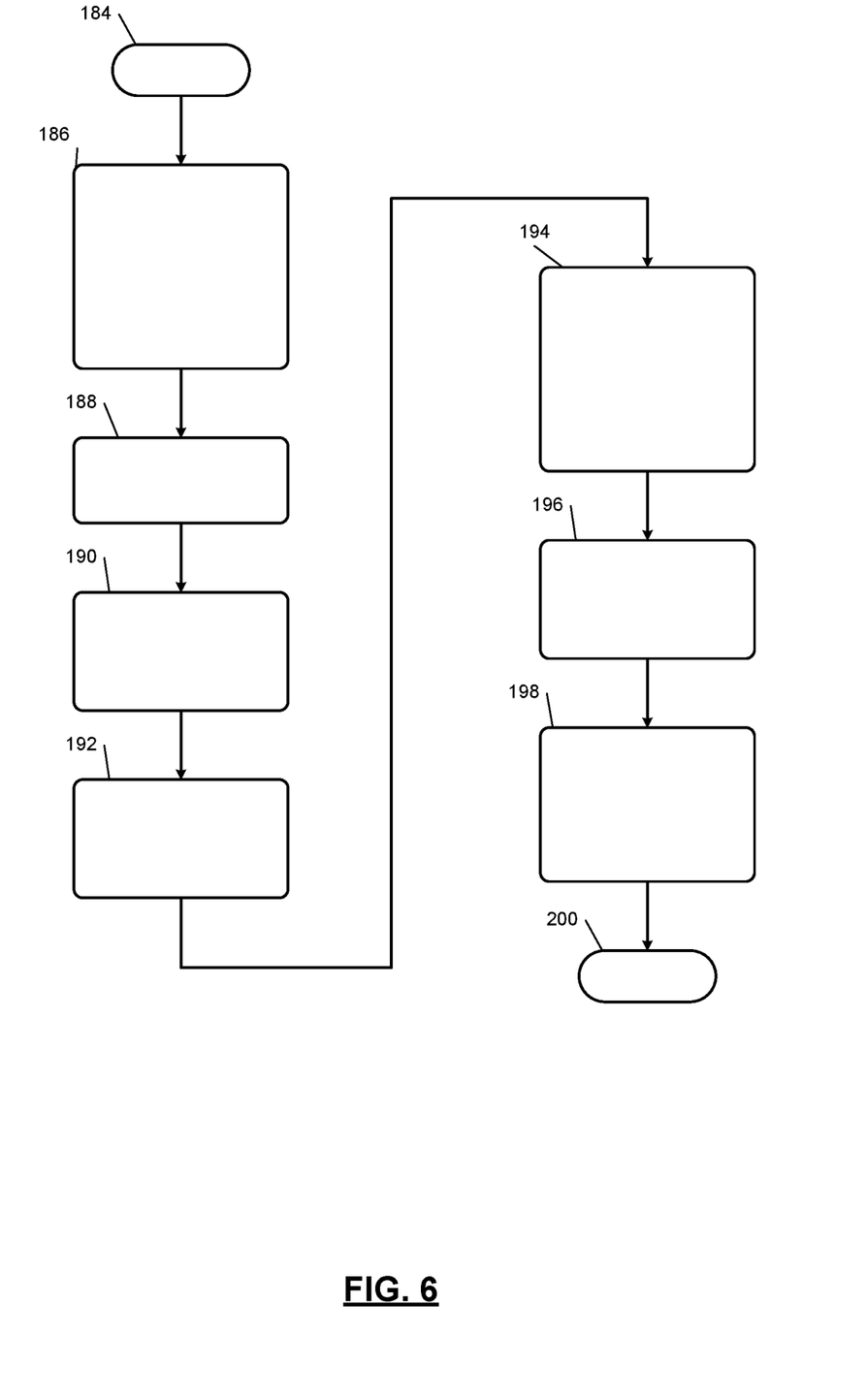
FIG. 6 is a flowchart illustrating a method of manufacturing the permanent magnet of FIG. 1.

Two or more steps of the method of FIG. 6 may be performed in parallel with one another. For example, steps 186 and 188 may be performed in parallel with one another. In another example, steps 190, 192, 194, and 196 may be performed in parallel with one another.

Figure 3A:
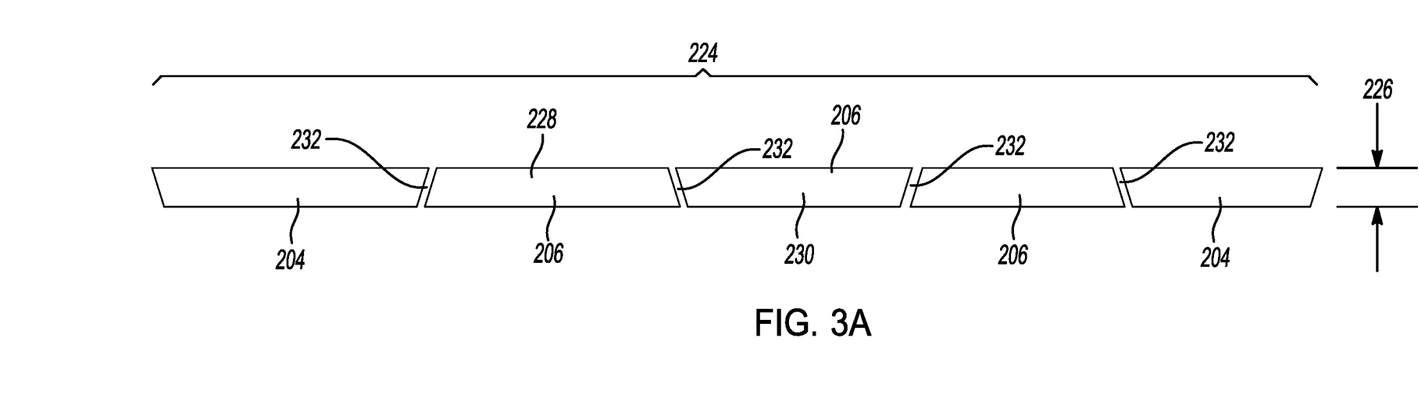
FIG. 3A is a plan view of a single permanent magnet (PM) piece separated into five smaller PM pieces.
Figure 3B:
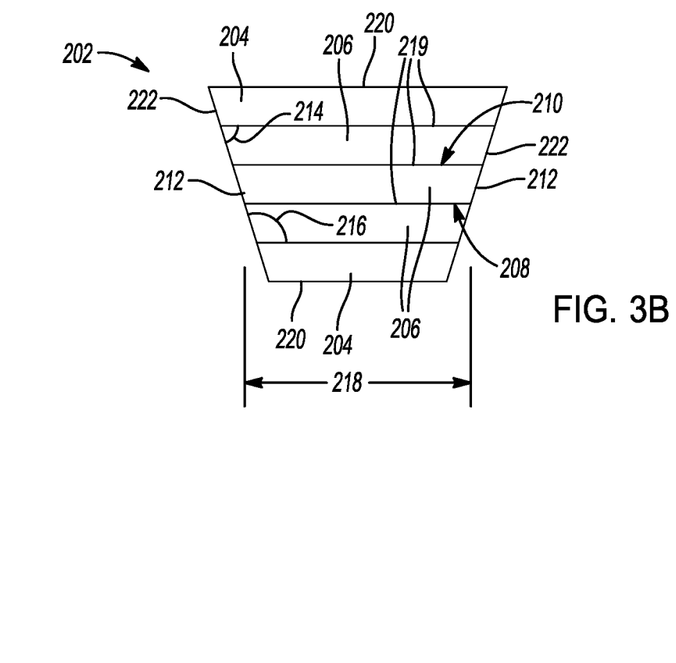
FIG. 3B is a plan view of the smaller PM pieces of FIG. 3A attached to one another to form another example of a permanent magnet according to the principles of the present disclosure.

Referring now to FIGS. 3A and 3B, a permanent magnet 202 may be used in place of one or more of the permanent magnets 112 on the rotors 110, 120. The permanent magnet 202 includes end PM pieces 204 and middle PM pieces 206. Each PM piece 204, 206 has an inner radial surface 208, an outer radial surface 210, and a pair of side surfaces 212 extending between the inner and outer radial surfaces 208 and 210. The inner radial surface 208, the outer radial surface 210, and the side surfaces 212 of the PM pieces 204, 206 have flat shapes. Each side surface 212 of each PM piece 203, 204 is oriented at one of two complementary oblique angles 214, 216 with respect to the inner or outer radial surfaces 208 or 210 thereof.

While all the PM pieces 204, 206 have the same shape, the PM pieces 204, 206 have different dimensions. Each PM piece 204, 206 has a different width 218 than the other PM pieces 204, 206. In the example shown, the width 218 of one end PM piece 204 is less than the width 216 of each middle PM piece 206, and the width 218 of the other end PM piece 204 is greater than the width 218 of each middle PM piece 206. The differences between the width 218 of each middle PM piece 206 and the widths 216 of the adjoining PM pieces 204 or 206 are equal to one another.

The radial surfaces 208, 210 of the PM pieces 204, 206 are attached to one another to form partitions 219 between the PM pieces 204, 206 that are configured to extend in the tangential direction 182 of each rotor 110, 120. Each inner and outer radial surface 208 and 210 of the middle PM pieces 206 is attached to the inner or outer radial surface 208 or 210 of another PM piece 204 or 206. Only one radial surface 208 or 210 of each end PM piece 204 is attached to the inner or outer radial surface 208 or 210 of one of the middle PM pieces 206, and the other radial surface 208 or 210 of each end PM piece 204 forms one of two ends 220 of the permanent magnet 202.

The PM pieces 204, 206 are positioned relative to one another so that the side surfaces 212 of the PM pieces 204, 206 form a pair of straight edges 222 on opposite sides of the permanent magnet 202. Each edge 222 extends from one end 220 of the permanent magnet 202 to the other end 220 thereof. The edges 222 are oriented at the oblique angles 214, 216 relative to the ends 220 of the permanent magnet 202 so that the ends 220 and the edges 222 form a trapezoidal shape.

The PM pieces 204, 206 are formed from a single PM piece 224 having a uniform thickness 226. The PM piece 224 has a top surface 228 and a bottom surface 230 that form the inner and outer radial surfaces 208 and 210 of the PM pieces 204, 206. The thickness 226 of the PM piece 224 extends between the top and bottom surfaces 228 and 230 thereof.

The PM pieces 204, 206 are formed by making multiple cuts 232 through the thickness 226 of the PM piece 224. In the example shown, each cut 232 is made at one of the oblique angles 214, 216 with respect to the top surface 222 of the PM piece 224, and the next cut 232 to the left or right is made at the other oblique angle 214 or 216 with respect to the top surface 222. The cuts 232 are spaced apart by different distances to yield the different widths 218 of the PM pieces 204, 206.

Cuts made through the ends 220 of the permanent magnet 202 to form partitions (not shown) that are configured to extend in the radial direction 172 of the rotors 110, 120. The cuts may extend completely through the end PM pieces 204 and may either extend only partially through the middle PM pieces 206 or not extend through the middle PM pieces 206 at all. In this regard, the cuts may be similar to those made to form the partitions 180 in the permanent magnet 112, albeit in a different direction.

With additional reference to FIG. 7, a method of manufacturing the permanent magnet 202 will now be described. The method begins at step 234. At step 236, the method makes multiple cuts through the uniform thickness 226 of the single PM piece 224 to form the PM pieces 204, 206 that each have the inner radial surface 208, the outer radial surface 210 and the side surfaces 212. At step 238, the method makes the cuts through the PM piece 224 at the oblique angles 214, 216 with respect to the top and bottom surfaces 228 and 230 of the PM piece 224.

At step 240 the method spaces the cuts apart by different distances so that the PM pieces 204, 206 have the different widths 218. At step 242, the method attached each radial surface 208, 210 of the middle PM pieces 206 to the radial surface 208 or 210 of another PM piece 204 or 206. At step 244, the method attaches only one radial surface 208 or 210 of each end PM piece 204 to the radial surface 208 or 210 of one of the middle PM pieces 206.

At step 246, the method attaches the PM pieces 204, 206 to another so that the side surfaces 212 of the PM pieces 204, 206 form the straight sides 222 of the permanent magnet 202. At step 246, the method attaches the PM pieces 204, 206 to one another to form the permanent magnet 202 having a trapezoidal shape. The method ends at 250.

Figure 7:
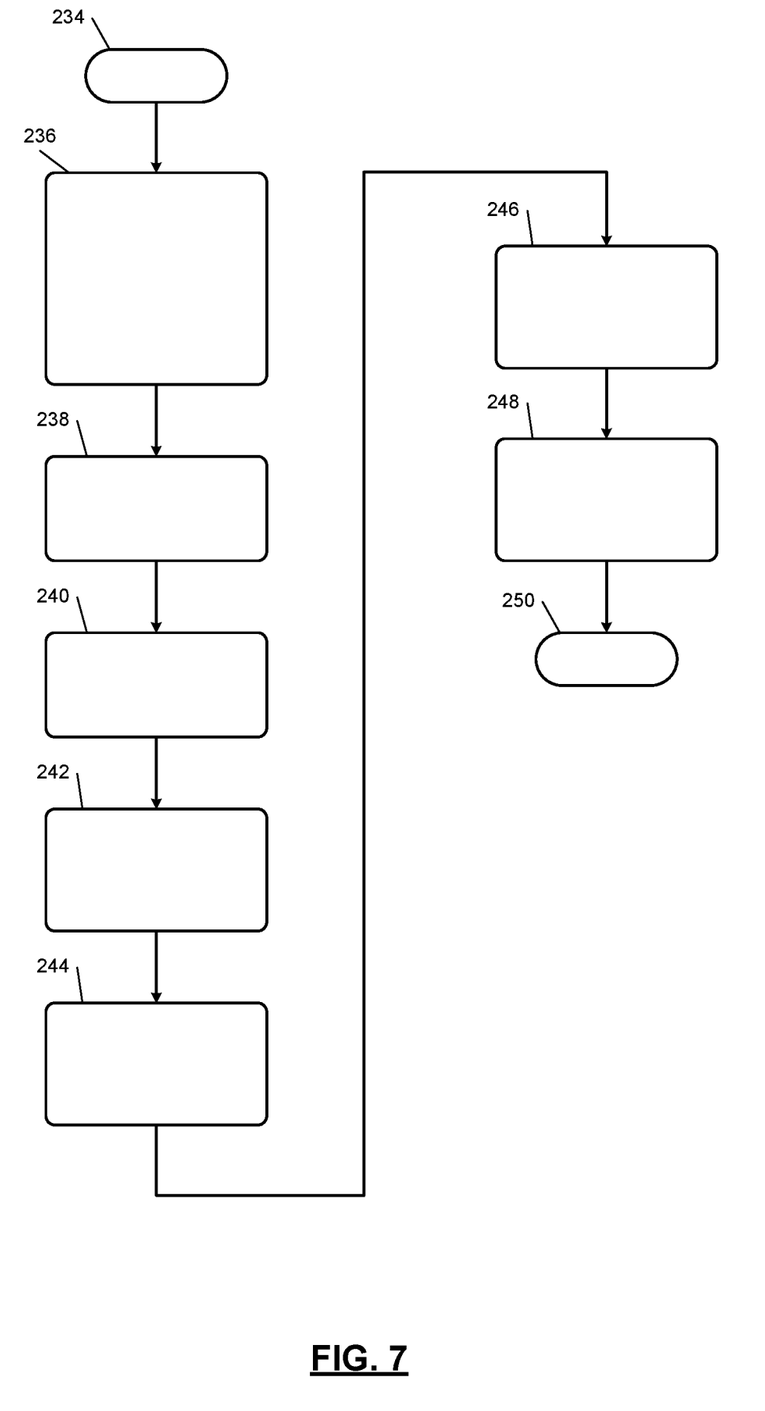
FIG. 7 is a flowchart illustrating a method of manufacturing the permanent magnet of FIG. 3B.

Two or more steps of the method of FIG. 7 may be performed in parallel with one another. For example, steps 236, 238, and 240 may be performed in parallel with one another. In another example, steps 242, 244, 246, and 248 may be performed in parallel with one another.

Figure 4:
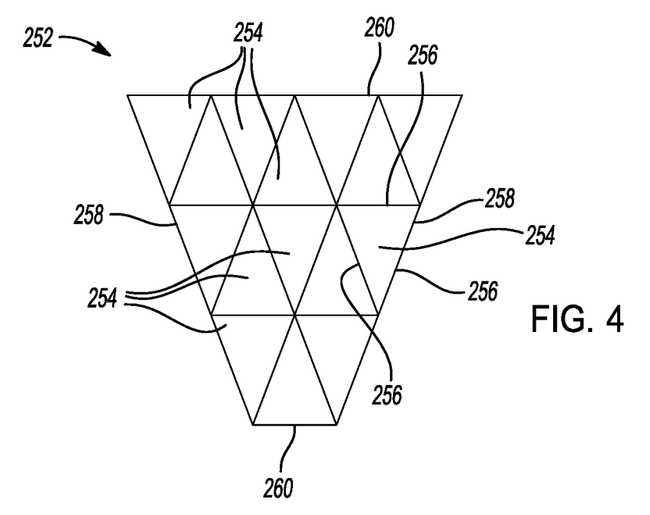
FIGS. 4 and 5 are plan views of other examples of permanent magnets according to the principles of the present disclosure.

Referring now to FIG. 4, a permanent magnet 252 may be used in place of one or more of the permanent magnets 112 on the rotors 110, 120. The permanent magnet 252 includes multiple PM pieces 254 that all have the same shape and substantially the same dimensions, which simplifies manufacturing. Each PM piece 254 has three side surfaces 256 that form a triangular perimeter thereof. The perimeter of each piece 254 has the shape of an isosceles triangle.

Some PM pieces 254 have only one side surface 256 thereof attached to one side surface 256 of another PM piece 254. Other PM pieces 254 have only two side surfaces 256 thereof attached to side surfaces 256 other pieces 254. Still other PM pieces 254 have all three side surfaces 256 thereof attached to side surfaces 256 of other PM pieces 254.

The PM pieces 254 are positioned relative to one another so that permanent magnet 252 has a pair of straight edges 258 on opposite sides thereof and a pair of straight ends 260 extending between the edges 258. The edges 258 and the ends 260 form the perimeter of the permanent magnet 252. The edges 258 of the permanent magnet 252 are configured to extend in the radial direction 172 of the rotors 110, 120, and the ends 260 of the permanent magnet 252 are configured to extend in the tangential direction 182 of the rotors 110, 120. The edges 258 of the permanent magnet 252 are oriented at complementary oblique angles relative to the ends 260 of the permanent magnet 252 so that the perimeter of the permanent magnet 252 has a trapezoidal shape.

Figure 5:
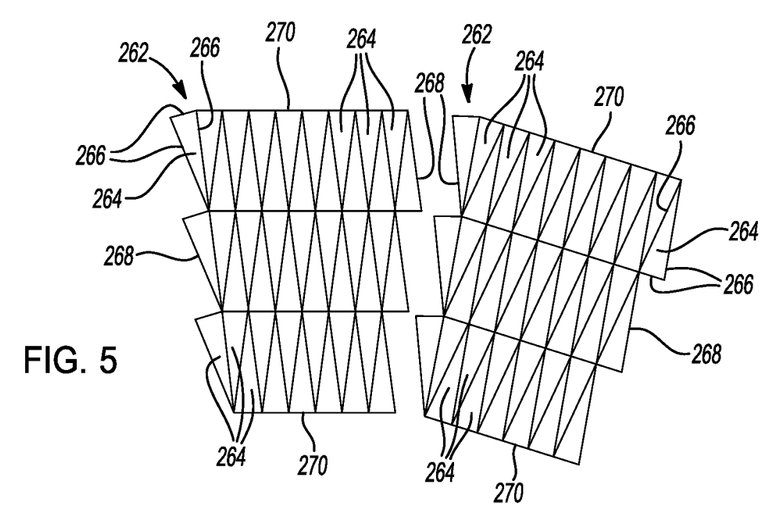

Referring now to FIGS. 5, permanent magnets 262 may be used in place of two or more of the permanent magnets 112 on the rotors 110, 120. Each permanent magnet 262 includes multiple PM pieces 264 that all have the same shape and substantially the same dimensions, which simplifies manufacturing. Each PM piece 264 has three side surfaces 266 that form a triangular perimeter thereof. The perimeter of each piece 264 has the shape of an isosceles triangle.

Some PM pieces 264 have only one side surface 266 thereof attached to one side surface 266 of another PM piece 264. Other PM pieces 264 have only two side surfaces 266 thereof attached to side surfaces 266 other pieces 264. Still other PM pieces 264 have all three side surfaces 266 thereof attached to side surfaces 266 of other PM pieces 264.

The PM pieces 264 are positioned relative to one another so that each permanent magnet 262 has a pair of non-straight edges 268 on opposite sides of the permanent magnet 262 and a pair of straight ends 270 extending between the edges 258. In the example shown, each non-straight edge 268 of each permanent magnet 262 has a zigzag shape. The non-straight edges 268 make it possible for the permanent magnets 262 to have a higher ratio of pole arc to pole pitch. The edges 268 and the ends 270 form the perimeter of each permanent magnet 262. The edges 268 of each permanent magnet 262 are configured to extend in the radial direction 172 of the rotors 110, 120, and the ends 270 of each permanent magnet 262 are configured to extend in the tangential direction 182 of the rotors 110, 120.

Figure 8:
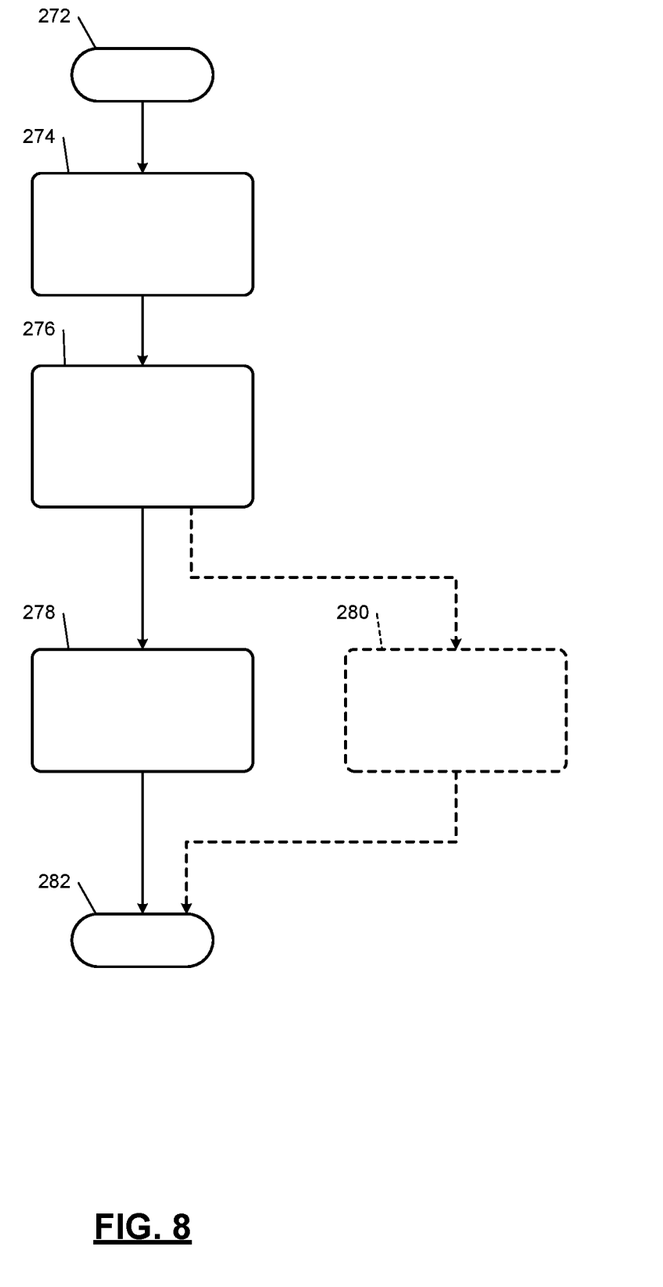
FIG. 8 is a flowchart illustrating a method of manufacturing the permanent magnets of FIGS. 4 and 5.

Referring now to FIGS. 4, 5, and 8, a method of manufacturing the permanent magnets 252, 262 will now be described. The method begins at step 272. At step 274, the method makes multiple ones of the PM pieces 254 having the same triangular shape with the three side surfaces 256. Alternatively, the method may make multiple ones of the PM pieces 264 having the same triangular shape with the three side surfaces 266.

At step 276, the method attaches one or more side surfaces 256 or 266 of each PM piece 254 or 264 to the side surface(s) 256 or 266 of another PM piece 254 or 264. At step 278, the method attaches the PM pieces 254 to another to form the permanent magnet 252 having a trapezoidal shape. Instead of performing step 278, the method may perform step 280. At step 280, the method attaches the PM pieces 266 to one another to form the permanent magnet 262 with the non-straight edges 268. The method ends at 282.

Two or more steps of the method of FIG. 8 may be performed in parallel with one another. For example, steps 276 and 278 may be performed in parallel with one another. In another example, steps 276 and 280 may be performed in parallel with one another.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A method of manufacturing a permanent magnet for a rotor of an axial flux electric machine, the method comprising:
    forming multiple permanent magnet (PM) pieces to have the same shape, each of the PM pieces having an inner radial surface, an outer radial surface, and a pair of side surfaces extending between the inner and outer radial surfaces;
    attaching at least one of the side surfaces of each of the PM pieces to one of the side surfaces of another one of the PM pieces to form partitions configured to extend in a radial direction of the rotor; and
    cutting through at least a portion of the multiple PM pieces, to form partitions configured to extend in a tangential direction of the rotor.

2. The method of claim 1 further comprising forming the PM pieces to have substantially the same dimensions.

3. The method of claim 1 further comprising:
    forming the inner radial surface of each of the PM pieces to have a concave shape;
    forming the outer radial surface of each of the PM pieces to have a convex shape; and
    forming each of the side surfaces of each of the PM pieces to have a flat shape.

4. The method of claim 3 further comprising attaching at least one of the side surfaces of each of the PM pieces to one of the side surfaces of another one of the PM pieces so that the inner radial surfaces of the PM pieces form a continuous arc and the outer radial surfaces of the PM pieces form a continuous arc.

5. The method of claim 1 wherein the PM pieces include end PM pieces and at least one middle PM piece, the method further comprising:

attaching each of the side surfaces of the at least one middle PM piece to one of the side surfaces of another one of the PM pieces; and attaching only one of the side surfaces of each of the end PM pieces to one of the side surfaces of another one of the PM pieces.

6. The method of claim 5 wherein cutting through at least a portion of the multiple PM pieces includes cutting through the end PM pieces, without cutting through the at least one middle PM piece.

7. The method of claim 5 further comprising:

forming the end PM pieces from a first material; and forming the at least one middle PM piece from a second material that is different than the first material.

\* \* \* \* \*